United States Patent [19]

Sills

[11] Patent Number: 4,693,010
[45] Date of Patent: Sep. 15, 1987

[54] MEASURING EQUIPMENT

[76] Inventor: Allan W. Sills, Westagon Lodge, Little Hyden Lane, Clanfield, Hampshire PO8 0RU, England

[21] Appl. No.: 829,141
[22] PCT Filed: Jun. 7, 1985
[86] PCT No.: PCT/GB85/00249
§ 371 Date: Feb. 5, 1986
§ 102(e) Date: Feb. 5, 1986
[87] PCT Pub. No.: WO86/00160
PCT Pub. Date: Jan. 3, 1986

[30] Foreign Application Priority Data

Jun. 9, 1984 [GB] United Kingdom ............. 8414770
Jan. 4, 1985 [GB] United Kingdom ............. 8500228
Jan. 4, 1985 [GB] United Kingdom ............. 8500229

[51] Int. Cl.$^4$ ............................................. G01B 5/06
[52] U.S. Cl. ............................ 33/147 L; 33/147 N
[58] Field of Search .......... 33/147 LN, 147 B, 147 R, 33/143 L, 143 R, 148 R, 148 G, 148 H; 271/4, 6

[56] References Cited

U.S. PATENT DOCUMENTS 1,692,243 11/1928 Beckmann et al. ............. 33/147 L
1,963,310 6/1934 Nichols ........................... 33/147 L
3,170,241 2/1965 Fibish ............................. 33/147 L
4,068,385 1/1978 Mitzel ......................... 33/147 L X
4,358,895 11/1982 Michaud ........................ 33/147 N
4,426,785 1/1984 Loftus et al. .................... 33/147 L

FOREIGN PATENT DOCUMENTS

10086 10/1955 Fed. Rep. of Germany .
WO82/01698 5/1982 PCT Int'l Appl. .
WO82/02037 6/1982 PCT Int'l Appl. .
1224563 3/1971 United Kingdom .
1497181 1/1978 United Kingdom .
1564155 4/1980 United Kingdom .
2046712 11/1980 United Kingdom .
2079506 1/1982 United Kingdom .

Primary Examiner—Harry N. Haroian
Attorney, Agent, or Firm—Lee A. Strimbeck

[57] ABSTRACT

Apparatus for measuring the thickness of sheet material and especially for use in bank note counting machines. Two sensory elements have a measuring field, such as an electric, magnetic or ultrasonic field, maintained between them. The elements which are initially in contact are separated by the thickness of the sheet material passing therebetween which causes a measurable change in the measuring field which change is used to determine the thickness and/or the count of the sheet material.

24 Claims, 17 Drawing Figures

MEASURING EQUIPMENT

FIELD OF THE INVENTION

The present invention relates to measuring equipment and in particular to equipment for measuring the thickness of sheet material. Such equipment finds application in bank note counting apparatus. However it is emphasised that the present invention is intended for use not merely in bank note counting apparatus, but also in apparatus for counting sheet material, for instance cheques and lottery tickets.

BACKGROUND OF THE INVENTION

Apparatus for counting bank notes usually incorporates thickness measuring equipment in order to ensure that where two notes so adhere together as to pass through the apparatus as one note, they are not counted as one note because the thickness measuring equipment identifies them as thicker than a single note.

Conventionally bank note thickness measuring equipment comprises a mechanically complex mechanism in which notes are passed successively through rollers which are displaced from each other by the thickness of the passing notes. By their very nature, measuring as they do thicknesses of the region of 0.004" (0.10 mm) these mechanisms should be very precise, but their precision has led them to be complex and hence massive. They must operate at high speed and their massiveness leads to the generation of high mechanical inertia forces during the passage of notes through them. These forces take a relatively long time to be damped out in comparison with the time taken for the notes to pass through the mechanism. Traditionally these problems of complexity and high inertia have been accommodated by ensuring that one of two nip rollers through which the bank notes pass remains translationally fixed in a rigid datum frame, with respect to which the other nip roller is moved by a note passing between the two rollers. The rigid datum frame is a source of weight and cost. A source of error can be that the actual measurement taken is that of the movement of the movable roller and inaccuracies can be introduced due to the linkages involved. Examples of this type of prior equipment are described in British Patent specification No. 1497181, published on Jan. 5, 1978 in the name of De La Rue Crosfield Ltd. and European Patent specification No. A2 0080309 published on June 1, 1983 in the name of De La Rue Systems Ltd.

Generally it has not been possible to arrange more than one pair of nip rollers across the width of the note path because of the need to precisely guide the other movable roller.

Bank note thickness measuring equipment operating as a result of physical properties related to the thickness of the notes does exist. For instance one commonly used equipment employs the light absorption characteristic of bank notes, detecting the difference in light levels passing through one note or two notes. However such equipment is inherently unreliable in that dirty notes absorb markedly more light than clean notes.

The object of the present invention is the provision of improved thickness measuring equipment in particular though not exclusively for bank note counting apparatus.

THE INVENTION

The invention is based on the measurement of the change in the physical characteristics of a measuring field between two sensory elements that changes with the separation of two sensory elements as the elements are separated by the thickness of sheet material during passage therebetween of the sheet material.

According to the invention there is provided sheet material thickness measuring equipment comprising at least one measuring station thereat defining a two-dimensional path for the sheet material through the equipment; a first sensory element at the measuring station to one side of the material path; a second sensory element at the measuring station to the other side of the material path and arranged opposite the first sensory element; at least one of the sensory elements being adapted to move away from the other sensory element on passage of sheet material along the material path whereby the elements' separation increases by an amount dependent on the thickness of the sheet material; the sensory elements being such that at least one measuring one of them is adapted to give an output corresponding to their relative movement on the passage of the sheet material in accordance with a change of physical characteristic propagated or present between the sensory elements.

The preferred physical characteristic for use in the invention is magnetism, in particular the variation in magnetic field strength due to a magnetic field generated at one or both sensory elements. For instance, when the sensory elements are moved apart the impedance in a coil generating the field changes from when the elements touch in the absence of a note therebetween to when they are separated by the thickness of one or more notes therebetween. This change in impedance can be readily detected by conventional means. Alternatively a search coil on the element at which the field is generated or on the other element or possibly on both may be employed to detect the variation in magnetic field strength. Again, the change in magnetic field strength—generated at one sensory element by either a permanent magnet or an electromagnet—could be detected via a Hall Effect device.

Another physical characteristic which it is anticipated may be used is the electrical capacitance between the two sensory elements. Changes in capacitance on separation of the sensory elements can be detected by conventional means.

Further, it is envisaged that one of the sensory elements could be an ultrasonic transmitter/receiver with the other being a reflector reflecting back the ultrasonic signal to the one through the note.

Normally one of the sensory elements will carry or be a transducer and the other element will be a reactive element.

Normally, either one of the sensory elements, preferably a transducer, will be fixed and the other, preferably reactive, displaceable from, though spring-biased towards the one. Alternatively they may both be displaceable though spring-biased towards each other. Normally the sheet material will pass directly between the sensory elements, and both sensory elements will bear directly on the sheet material during its presence between the sensory elements. Alternatively the sheet material can pass not directly between the sensory elements, but close to them and a mechanism will then be provided for bearing on at least one side of the sheet material for moving the sensory elements apart in the presence of the sheet material at a material abutment member of the mechanism, the mechanism carrying at least one of the sensory elements, preferably a transducer.

In other envisaged arrangements, one of the sensory elements will be carried by a sensory element carrying mechanism bearing on a respective side of the sheet material via a material abutment member of the mechanism, the carried sensory element preferably being a transducer.

Preferably, a plurality of pairs of sensory elements is provided across the width of the material path.

In a preferred embodiment, each pair of sensory elements is provided at a respective measuring station comprising its pair of sensory elements and two pairs of sheet material gripping rollers, the pairs of rollers being provided on opposite sides of the sensory elements transversely in the note path and the two rollers in each pair of rollers being provided opposite each other on opposite sides of the material path. Conveniently, one of each pair of sheet material gripping rollers has an elastomeric material tire.

When used in bank note counting apparatus, the following advantages of the invention are expected:

(i) the apparatus will be lighter and cheaper in that a very rigid datum frame surrounding the note path is not required;

(ii) the apparatus will be more reliable in that few moving parts are required and a dimensionally stable chassis is not required;

(iii) the apparatus will be readily adaptable to counting different notes.

The possible small size of the measuring equipment of the invention enables more than one pair of sensory elements to be arranged across the width of the note path. This can result in a number of further advantages:

(iv) where a note has been mended with self-adhesive tape, this may be detected at one position but not at the others; thus logic equipment fed by the measuring equipment will be able to discount this anomalous high thickness reading caused by the tape. By contrast conventional roller-type equipment is unable to distinguish a local thickening of a note and hence measures the thickest portion of the note; thus the conventional equipment is liable to assume that a mended note is two notes; and (v) skewness of notes to the note path can be detected by non-synchronous initial measurement readings.

The coupling of several pairs to one logic equipment will enable the individual measurements to be averaged hence increasing reliability and enabling spurious measurements such as due to the silver strip in bank notes to be ignored. In this respect it should be noted that it is anticipated that the only physical characteristic of the notes to cause a marked change at all the equipments will be the thickness of the note(s), with other characteristics (which can vary with the age of the note) having negligible effect.

The use of logic equipment will enable plural notes passing through the apparatus at a time to be detected from a departure of the sensor outputs from a range of values as opposed to being detected by an assessment of the absolute value of the thickness of the notes.

To help understanding of the invention, various specific embodiments thereof will now be described by way of example and with reference to the accompanying drawings in which:

THE DRAWINGS

FIG. 1 is a diagrammatic side view of thickness measuring equipment of the invention, with an enlarged detail showing in FIG. 1A the presence of a note between sensor feelers and in FIG. 1B the absence of a note therebetween;

First Embodiment

Figures 1, 1A, 1B:
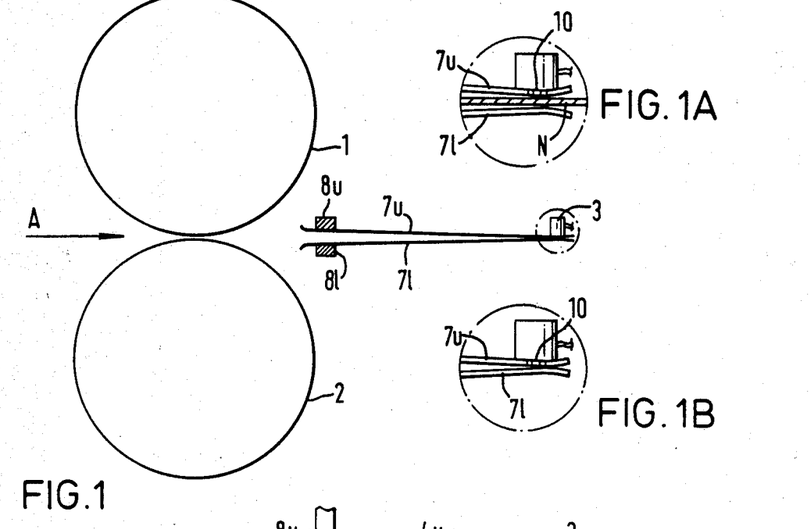
Figure 2:
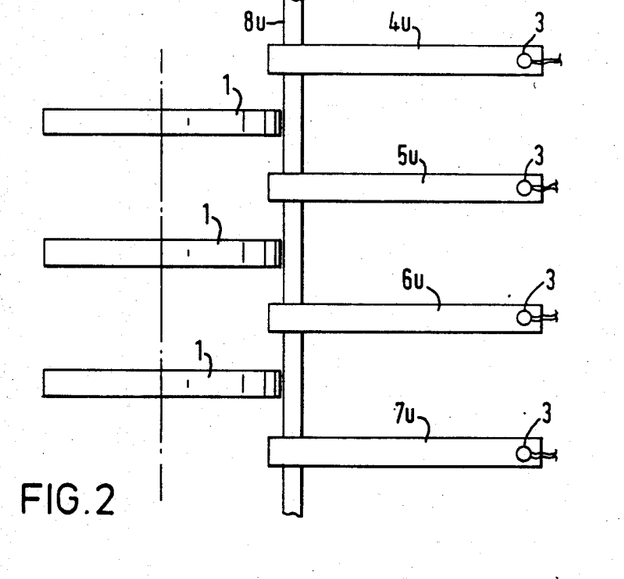
FIG. 2 is a diagrammatic plan view of the equipment of FIG. 1.

In FIGS. 1 and 2, feed rollers 1,2 are shown for feeding notes through the equipment, normally one at a time but possibly two or more at a time where they adhere together. Where the equipment is incorporated in bank note counting apparatus, other devices will be provided up- and downstream (in the direction of the arrow A denoting note movement direction along a note path through the equipment, the note path having a width transverse to the direction A at least as wide as the widest expected note) of the shown equipment for handling the notes and counting them; although in the latter respect it is anticipated that provided there is a sufficient gap between successive notes the equipment of the invention may be capable of inputting a counter according to each new presence or absence of a note in the equipment at sensors 3.

From the rollers 1,2 the notes are passed between pairs of upper and lower guide/sensor feelers $4_u$, $4_l$; $5_u$, $5_l$; $6_u$, $6_l$; $7_u$, $7_l$. The feelers are rigidly attached to transverse support members $8_u$, $8_l$ and extend therefrom in the general direction of note travel A. The feelers are resilient and biased so as to touch at their free ends when a note is not between respective pairs.

The upper ones of the feelers carry sensors in the form of electromagnetic proximity detectors 3, each having a pole piece 10 touched either by a note N or by the respective lower feeler. The signal of the proximity detector differing in accordance with the situation is fed to a computer (not shown) for analysing the signal from each detector 3. Since the bank notes to be counted, at least when they are all of one type, will have a reasonably uniform thickness the detectors' signals will be recognisable as signifying the absence of a note, the presence of one note, the presence of two notes and so on. Anomalous signals may be ignored where for instance one signal in four is anomalous. According to the average value of the signals the equipment will measure the thickness of the note(s) present between the feelers. The computer may be programmed to output either the absolute value of this thickness or the number of notes present where the mean note thickness is known. It will be recognised that in the latter mode a limited range of absolute values will signify one note. There will be a step in values between the one-note thickness and two-note thickness for instance. Because of this step it is unnecessary for the absolute value of the signals to be measured accurately.

Where a note passes skew through the equipment, the signal from one detector will change prior to the signal from the others, in particular the detector at one side will register presence of the note before the signal at the other side. Analysis of the times of these signal changes will indicate whether the note is passing skew through the equipment.

Second Embodiment

Figure 3:
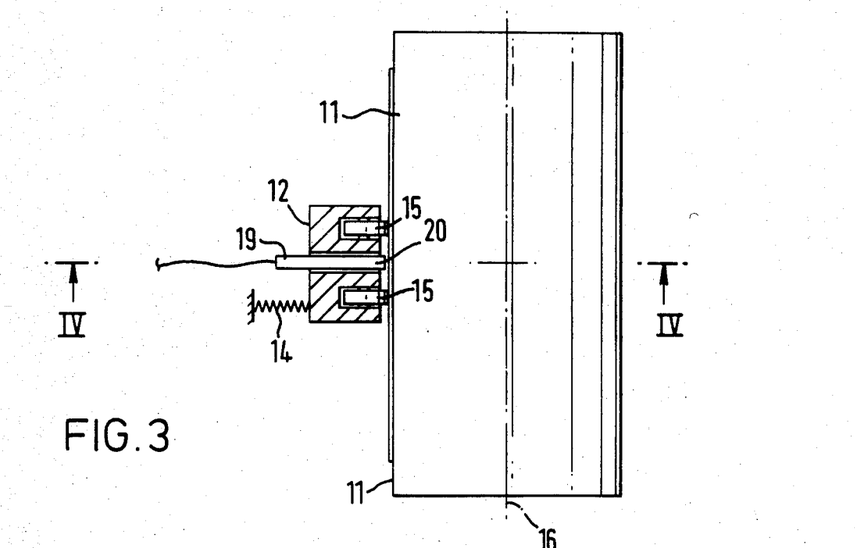
FIGS. 3 and 4 are respectively a cross-sectional view on line III—III from above and an end cross-sectional view on line IV—IV of a second measuring equipment of the invention in which (a) one of the sensory elements is a roller and (b) the sensory element carrying an actual transducer does not touch the other sensory element or the note.
Figure 4:
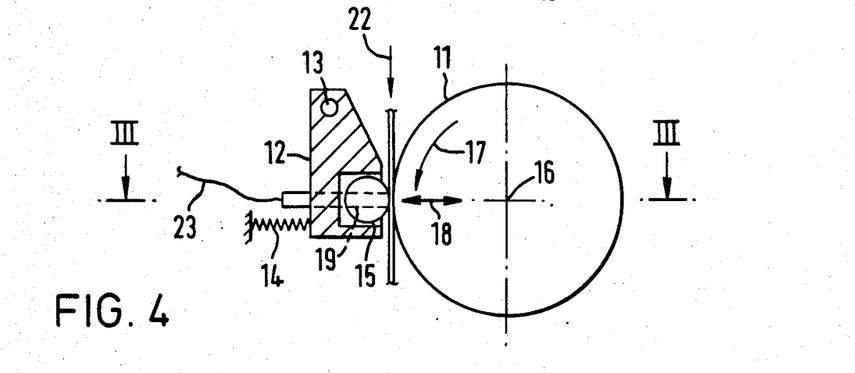

Referring now to FIGS. 3 and 4, the measuring equipment there shown comprises a sensory roller 11 and a sensor carrying mechanism including a follower 12. The latter is pivoted at 13 and urged by a spring 14 towards the roller 11, whereby wheels 15 on the follower run on the surface of the roller as it rotates about its axis 16 in the direction of arrow 17. The arrangement is such that the follower closely follows in the direction of arrow 18 any radial imperfections in the roller, such as out of roundness.

The follower carries an electromagnetic transducer 19 which is arranged radially of the roller 11 between the two wheels 15 of the follower. The geometry of the equipment is such that for small movements of the following, the transducer moves substantially longitudinally. When no bank note is present, although the transducer may move with respect to the equipment's frame, it remains at a substantially constant distance from the surface of the roller. This distance, i.e. separation of the transducer head 20 from the surface of the roller, can be very small in the absence of a note without the transducer head actually touching the roller, for instance of the order of half a "thou", i.e. 0.13 mm.

When a note is fed on the surface of the roller 11 in the direction of the arrow 22 i.e. on a note path between the roller and the follower 12, the note displaces the wheels 15 and hence the transducer 19 from the surface of the roller by the thickness of the note. With the transducer head thus separated from the roller surface by the original very small distance plus the note thickness, a signal corresponding to the thickness of the note is fed from the transducer via its cable 23 to analysing equipment-not shown.

After passage of the note, the spring 14 urges the following back towards the roller, with the transducer again sensing the original very small distance.

This equipment has the advantage that rolling contact only is made with the note and that no rubbing contact under the spring's urging is made by the transducer head with either the roller 11 or the note. Accordingly wear of the sensor is not a problem with this equipment.

On the other hand, the response signal from the transducer tends to be noisy. In order for the follower to faithfully follow the surface of the roller 11, the wheels 15 are preferably metallic with metallic bearings. Conveniently the wheels are in fact the outer races of ball bearings. These give rise to the noise.

Third Embodiment

Figures 5, 6, 7, 8:
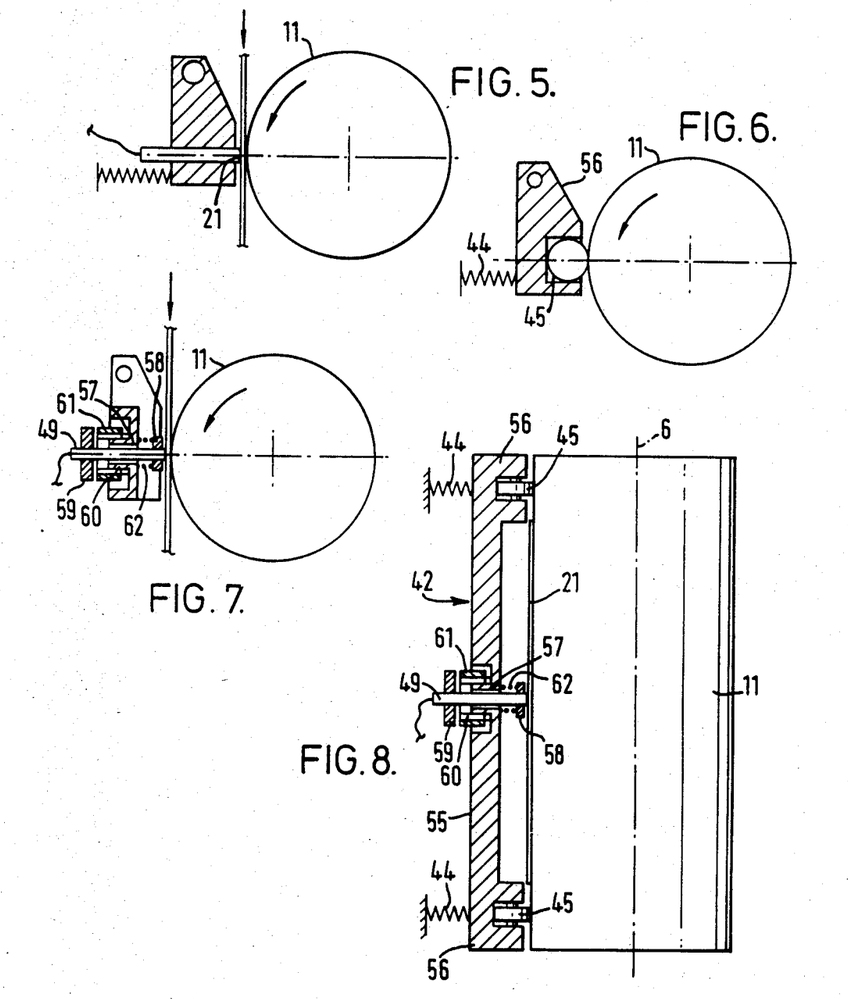
FIG. 5 is a view similar to FIG. 4 of a third measuring equipment of the invention.
FIG. 6 is a cross-sectional view from above and FIGS. 7 and 8 are end cross-sectional views respectively on lines IV—IV, V—V and VI—VI of a fourth measuring equipment of the invention.

Turning now to FIG. 5, in the alternative there shown no wheels running on the roller 11 are provided. Instead the head 21 of the transducer protrudes slightly from the roller side of the follower and rubs directly on the roller 11. Conveniently the head of the transducer is rounded to ease passage of the note between itself and roller. Also the head is conveniently hardened by being of hard ceramic material to combat wear of the transducer, which rubs directly on the note when present and the roller in the absence of a note.

This alternative has the advantage of simplicity. Further zero error problems due to dirt on the wheels 45 and to slack in the wheel bearings and to incorrect fixing of the transducer in the follower, causing the very small original separation from the roller to vary, are absent. However it has the disadvantage of the constant wear inducing rubbing of the transducer head. Also the rubbing tends to cause noise in the transducer response signal.

Fourth Embodiment

Turning now to FIGS. 6,7 and 8, another alternative is there shown. The follower 42 of this equipment is elongate in the direction of the roller's axis 16. Wheels 45 of the follower run on the roller 11 outside the path of the note 21 through the equipment. The transducer 49 is movably mounted on a bar 55 of the follower which interconnects wheel carrying end portions 56 of the follower. A bore 57 directed radially of the roller 11 is provided midway along the bar 55. The transducer extends through this bore and has collars 58,59 fast on its ends on either side of the bar. Surrounding the bore 57, the bar is machined on its side opposite from the roller 11 into a stud 60 having an external screw thread on which is threaded a nut 61. On the other side of the bar a coil spring 62 acts between the bar and the collar 58 on the roller end of the transducer.

In the absence of a note, the follower bar is urged by two springs 44 towards the roller 11 so that the wheels 45 run on the roller 11. The spring 62 urges the sensor 49 towards the roller. The equipment is set up so that grazing contact only occurs between the transducer and the roller, by adjusting the nut 61 to abut the collar 59 when grazing contact is achieved.

In variant of this equipment a plurality of similarly arranged transducers may be provided along the follower bar 55.

When a note is fed through the equipment, the transducer is moved back against the spring 62 in a similar manner to the transducer of FIG. 5 by contact of its head with the note. However in contrast to the follower of FIG. 5 which moves with the transducer 49, the follower bar 55 does not move by reason of the presence of the note. (It may not move due to out of roundness of the roller, since the wheels 45 run on the surface of the roller outside the note path.) Once the note has passed, the spring 62 moves the transducer 49 forwards again into grazing contact with the roller.

This equipment has the advantage that the transducer head is not permanently spring urged against the roller in the absence of the note; and so does not have the wear problem of the FIG. 5 equipment. When a note is present, the displacement of the transducer, i.e. the separation of its head from the roller surface, is precisely the local thickness of the note. In this respect it has the advantage of the FIG. 5 equipment over the FIG. 3 equipment, in that thickness errors cannot be introduced by the wheels, for instance picking up dirt from running on successive notes.

Fifth Embodiment

Figure 9:
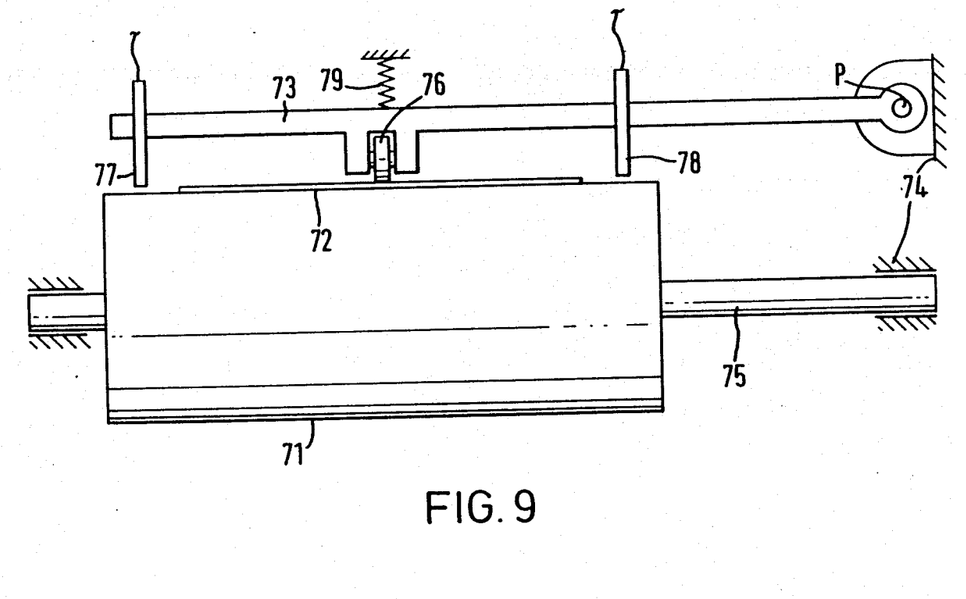
FIG. 9 is a plan view of a fifth measuring equipment of the invention.

Turning now to FIG. 9, this measuring equipment has a roller 71 acting as one sensory element and arranged for guiding a note 72 past a transducer carrying mechanism including a follower 73. The follower is pivoted to the equipment's frame 74 in which the roller is mounted about its axis of rotation 75. The follower is in the form of an elongate arm carrying centrally of the note 72 a wheel 76 which runs on the surface of the roller 71 in the absence of the note and runs on the note when present. When the note is present, the wheel 76 is displaced from the roller by the thickness of the note. A spring 79 biasses the follower 73 towards the roller 71.

On either side of the note path, the arm carries transducers 77,78 which are adjusted on the arm to be very close to the roller when no note is present. When a note is present, the transducers are moved back by amounts corresponding to the ratios of their leverage about the pivot P with respect to the wheel 76. Where the wheel is equally spaced between the transducers, the sum of their movements for unit movement of the wheel is equal to twice the movement of the wheel. Accordingly the sum of the increased separation of the two transducers 77,78 from the surface of the roller 71, at these measurement points, is equal to twice the displacement of the wheel 76 caused by the thickness of the note, at the detection point. Non-illustrated analysing equipment is calibrated accordingly.

Where it is desired to measure the thickness of the note at a position other than centrally of the note (and even possibly in this case) a single transducer may be employed. Conveniently it will be positioned at whichever side of the note path to which the detection wheel is closest.

This measuring equipment has advantage in that no rubbing contact and hence no wear occurs between the transducer(s) and the roller.

In a variant of this embodiment, it is envisaged that by suitably treating the follower with wear resistant bearing material, the wheel 76 could be dispensed with. Further, if the follower were pivoted in a plane above or below the plane of FIG. 9, the displacement at transducers 77,78 could be arranged to be equal to the displacement of the wheel 76 or that put of the follower rubbing on the note 72 or roller 71.

Sixth Embodiment

Figure 10:
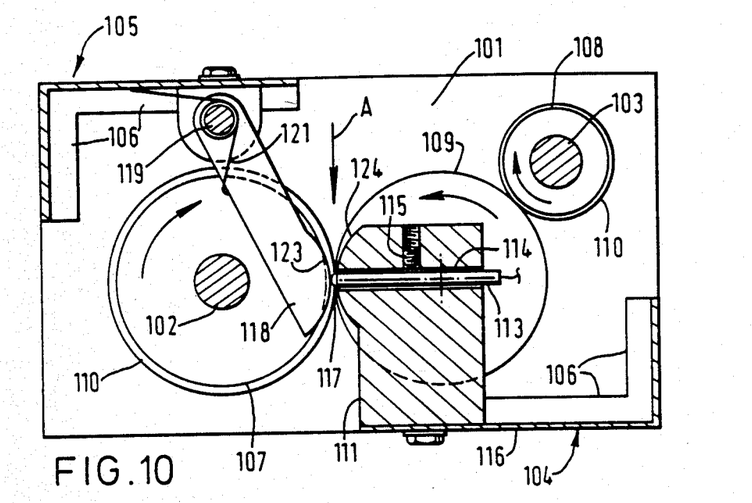
FIGS. 10 and 11 are respectively an end cross-sectional view on the line X—X and a scrap plan view of a fifth measuring equipment.
Figure 11:
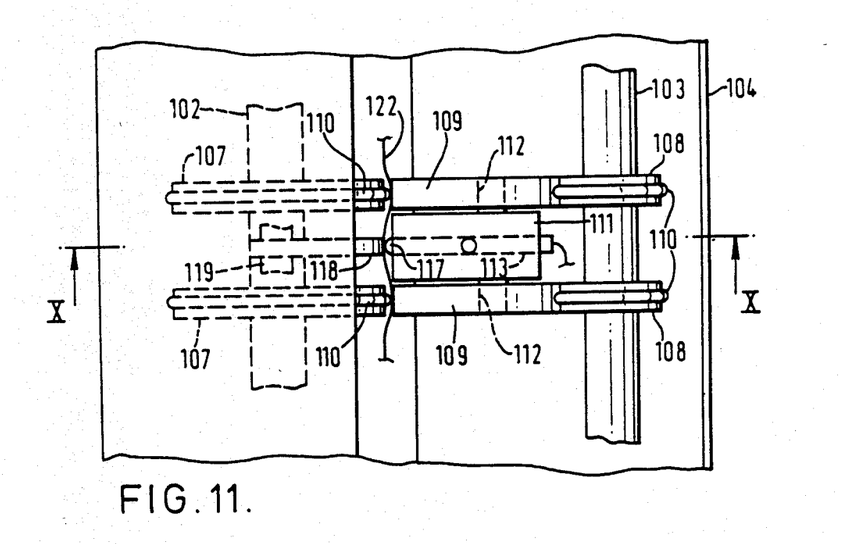

Another equipment is shown in FIGS. 10 and 11. It has an aluminium frame comprised of two end plates 101—for supporting bearings for drive shafts 102,103—and sheet angles 104,105 attached by end flanges 106 to the end plates. It should be noted that although the frame is reasonably stiff in other respects, it is not particularly stiff in torsion and the webs of the angles are not reinforced. Accordingly, the frame as a whole can flex and components mounted on the webs can displace by a small amount, if not in service, during handling of the equipment prior to installation in other apparatus.

The drive shafts 102,103 extend between the end plates 101 (of which only one is shown) and carry drive members. The drive members on shaft 102 are referred to as rollers 107 and those on shaft 103 as wheels 108 since the drive rollers 107 roll on notes passing through the equipment whilst the drive wheels 108 do not directly drive the notes. In the absence of a note in the equipment each drive roller 107 contacts and drives a driven roller 109. When a note is present between the rollers 107 and 109, the driven rollers 109 continue to be driven by the drive wheels 108. A non-illustrated drive train and motor is provided for driving the members 107,108 in suitable directions at suitable speeds. All the drive members are provided with elastomeric O-rings 110 in grooves on their circumferences for transferring their drive.

As may be seen in FIG. 11, the drive rollers 107, driven rollers 109 and drive wheels 108 are provided in pairs at measuring stations. Several such stations may be provided across the path of a note through the equipment, but only one is shown and described here.

At the measurement station, the drive members are secured on their drive shafts. The driven rollers 109 are rotatably mounted on opposite sides of a transducer block 111 on spigots 112 fast in the block. Extending centrally of the block, between the rollers 109 and normally towards the drive shaft 102 is a transducer 113 for which a bore 114 is provided in the block. The transducer is located in the block by a grub screw 115. The block itself is secured to the web 116 of the aluminium angle 104.

Opposite the head 117 of the transducer a sensory blade 118 is provided. It is pivotally connected on a pivot pin 119 to the web 120 of aluminium angle 105. The sensory blade 118 is urged by torsion spring 121 into contact with the transducer head 117—in the absence of a note. Should the equipment's frame be twisted to a moderate degree or the webs 116, 120 be moderately flexed, the blade 118 will continue to be urged against the transducer head 117.

When a bank note 122 is introduced in the direction of the arrow on the note path A between the transducer head and the sensory blade 118, the latter will be displaced backwards against torsion spring 121 by an amount at the transducer head corresponding to the note's thickness. The transducer's output, in cooperation with the blade will indicate the thickness of the note.

The geometry and arrangement of the components at the measurement station should be noted in two respects. Firstly, as may be seen in FIG. 10, the sensory blade 118 at 123 and the transducer block at 124 are radiused with a smaller radius of curvature than respectively the drive rollers 107 and the driven rollers 109. Since the tangential contact between the rollers 107,108 and the blade at 123 and the block at 124 (if the transducer head is flush with the radius 124) are at the same level, the radiusing to a smaller radius provides that the bank note is primarily guided by the rollers 107 and 108 and only contacts the transducer/block combination and the sensory blade at the level of their normal contact.

Secondly, as may be seen in FIG. 11, the transducer head 117 is set slightly proud of both its block 111 and the driven rollers 109 whereby to tension the note as it passes in a slightly curved shape between the rollers and the sensor and blade.

This equipment has the advantage of there being no rubbing or rolling contact between the transducer or its supporting member with the other sensory element/blade when a note is not present. Accordingly only a low background noise signal is generated by the transducer and wear is low. The passing notes do rub against the sensory blade, but wear of this is relatively unimportant due to its automatic takeup by the torsion spring 121. The notes also rub on the transducer head. However wear of this can be obviated by forming it of a hard material, preferably diamond containing. The rubbing of the sensory element surfaces by the notes does have the advantage that any build-up of error inducing dirt is avoided.

In a non-illustrative variant, the pivoted sensor blade arrangement is replaced by a plunger arrangement having a sensory element arranged to plunge co-axially of the transducer and normally of the path—as shown.

It is envisaged that many of the components of the equipment, including the rollers, the transducer block and possibly the frame may be of plastics material. Also it is envisaged that the wire torsion spring 121 may be replaced with an elastomeric torsion spring. This would have advantage where the elastomeric material was chosen to dampen the movement of the sensor blade.

Seventh Embodiment

Figure 12:
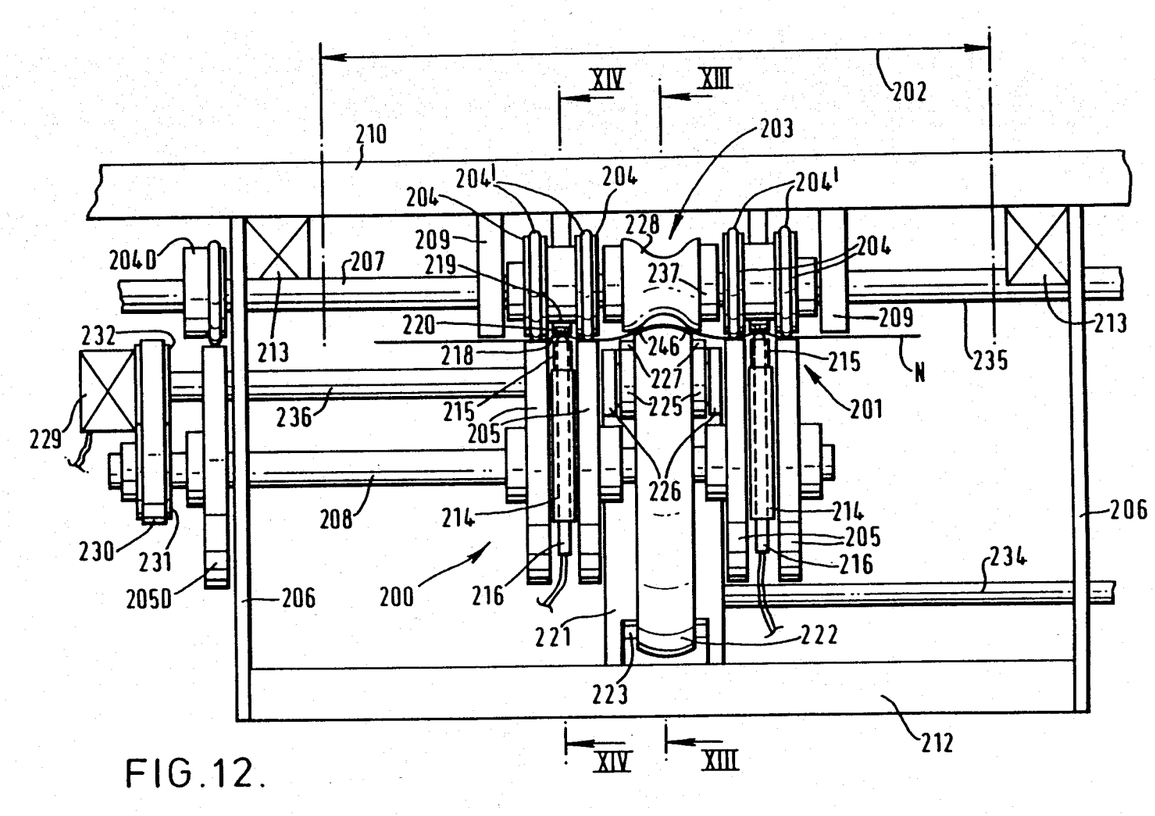
FIG. 12 is a downstream end view of a preferred measuring equipment of the invention.
Figure 13:
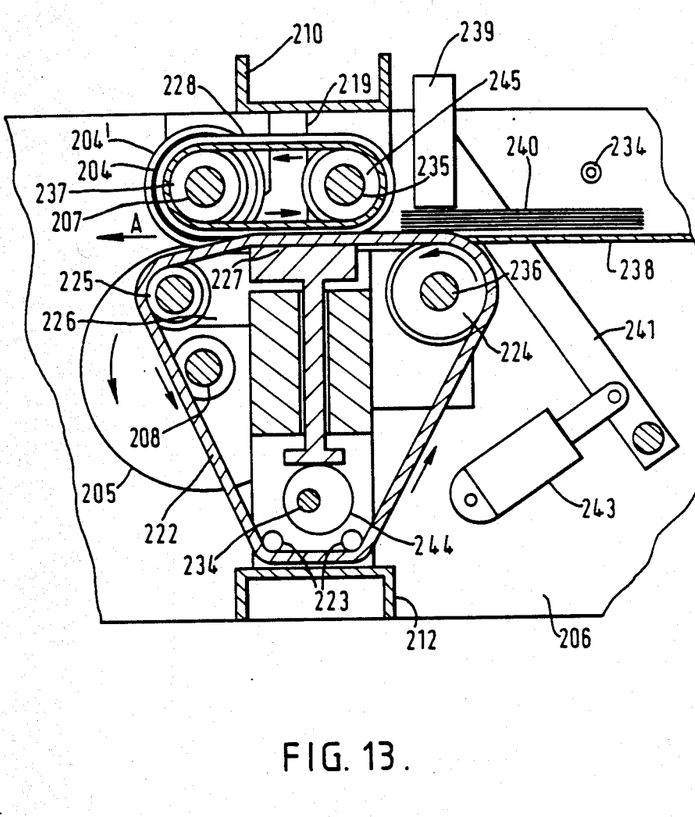
FIG. 13 is a cross-sectional side view on line XIII-—XIII of the equipment of FIG. 12, showing a separator.
Figure 14:
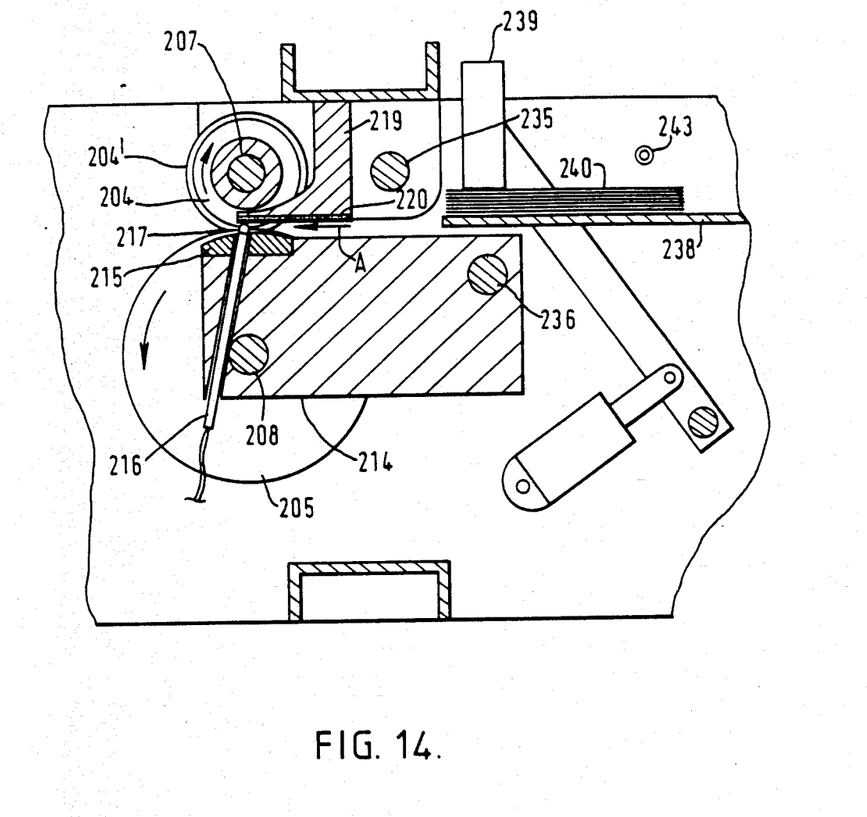
FIG. 14 is a cross-sectional side view on line XIV—XIV of the equipment of FIG. 12, showing a measurement station.

Turning now to FIGS. 12 and 14, the measuring equipment there shown is incorporated into bank note counting apparatus. It incorporates two measuring stations 200 and 201, and a note separator 203. The two measuring stations are identical and only one will be described. It should be noted that the width of the equipment is such that two further measuring stations could be incorporated, one extra next to 200 and the other next to 201. The width of the note path through the equipment for a note N is denoted in FIG. 12, by 202, whereas its direction is denoted in FIGS. 13 and 14 by arrow A. Each station comprises a pair of upper 25 mm drive rollers 204 carrying elastomeric O-ring tires 204' which in the absence of a note bear on larger 60 mm driven rollers 205. The tires are shown as having a circular cross-section, but may be moulded with a rectangular cross-section to improve their grip on the note N. The drive rollers 203 of both measuring stations together with a dummy drive roller 204D outside a frame plate 206 are mounted on a common drive shaft 207. The driven rollers 205 of the two stations and a dummy roller 205D are mounted on a common driven shaft 208. The dummy rollers 203D and 205D are provided to ensure continuity of drive in the presence of a note in the nip between drive rollers 203 and driven rollers 205.

The drive shaft 207 is journalled via rolling element bearings (not shown) in bearing blocks 209 attached to an upper frame member 210 which carries a drive motor, not shown. Because all the drive connections are via the tires 204', the upper frame complete with drive motors can be detached from the lower frame comprised of side plates 206 and lower frame member 212 for service repairs. Latch connections 213 are provided for detachment and re-attachment of the upper frame member.

The driven shaft 208 is journalled in transducer carrying plates 214—one for each station. Each plate 214 has a nylon material upper member 215 on which the notes may rub. Each plate 214 carries its transducer 216 which is of a type supplied by Huntleigh Technology of Cambridge, England, under the name Namur, No. INO 001 JCF, specially fitted with a diamond material end face 217. Opposite the upwardly directed end face 217 is provided a spring steel sensory wiper 218 backed by a backing member 219 with the interposition of damping foam elastomeric material 220, the backing member 219 being fixed to the upper frame member 210. In use, notes pass between the transducer face 217 and wiper 218.

The transducer supporting plates 214 are fixed to a central column 221, itself fixed to the lower frame member 212. A lower separation belt 222—having a domed transverse cross-section—of the separator 203 passes through a slot at the foot of the column 221 over rollers 223 and up, in its direction of rotation, to its drive roller 224 connected on a clutch shaft 236 also journalled in bearings in the plates 214 at the end thereof remote from the transducers 216, i.e. to the right in FIG. 13. Thence the belt passes back to the left to free roller 225 journalled on a rear extension 226 of the column 221. Thence the belt 222 passes to the rollers 223. Between the drive roller 224 and the free roller 225, belt 222 passes over a plate 227 for adjusting the spacing of the belt 222 from a reverse belt 228 - having a recessed transverse cross-section—carried by the upper frame 210, the belt 228 being described further below. The clutch shaft 236 is driven through a clutch 229 via a toothed belt 230 and belt wheels 231,232 from the driven shaft 208. The clutch 229 is normally engaged, but selectively disengaged when a counter—not shown—counts that a predetermined number of notes have passed through the equipment. When the clutch is engaged, the belt 222 travels at approximately 40% of the peripheral speed of the nip rollers 204,205 for causing gaps in the direction A between the notes, whereby they are driven one at a time through the nip rollers.

The plate 227 is adjusted up and down by an eccentric 244 on a shaft 234 to which a knob, not shown, engageable in a number of angularly spaced detents, is attached.

The separator 203 includes the reverse belt 228 driven by a drive roller 245 journalled on a slow drive shaft 235 driven by a reduction drive motor—not shown—carried by the upper frame member 210. The shaft 235 is centred over the right-hand edge of the adjustment plate 227, see FIG. 13. The belt 228 extends around an idler roller 237 freely rotating on the drive shaft 207 of the drive rollers 204 between these rollers of the two measurement stations.

A note receiving platen 238 is positioned to either side of and away from the roller 224; and a note pressing member 239 bears downwards on a pile of notes 240, when present on the platen, to press the lowest note onto the lower separation belt 222 at the roller 224. The member 239 is carried by an arm 241 pivoted to the frame plates 206 to the right of the equipment in FIG. 14 and below the platen whereby when a thick pile of notes is present, the effective weight of member 239 over the roller 224 is reduced. For positioning of the notes on the platen between the member 239 and roller 224, the former is lifted by an actuator 242 activated by interrupting a light beam associated with a photocell 243 just above the normal highest position of the pile of notes. The light beam is interrupted by the notes as they are lowered into position.

The lower belt 222 and reverse belt 228 have a complementary though not mating domed/recessed cross-sectional shape as shown in FIG. 12. With the belt 228 moving backwards and the belt 222 moving forwards much faster and their spacing adjusted via the plate 227, the notes are fed forwards to the measuring stations one at a time.

A note stacker—not shown—is provided for stacking the notes as they leave the measuring stations.

The belts 222 and 228 may each be replaced by two pairs of circular cross-section belts positioned to give a small separation between those replacing 222 and those replacing 228.

In use of this embodiment, the stack of notes is placed on the platen 238 and over the lower belt 222 at its drive roller 224. The act of placing the notes will have lifted the member 239, by interruption of the beam to the photocell 243; then after a delay the member 239 is automatically lowered and the drive motor started or the clutch 229 engaged. The lower belt 222, via its domed shape bearing on the lowest note of the stack, draws it into the equipment. The separation of the lower belt 222 from the upper belt 228 having been set by the height of the plate 227 to a value appropriate for the particular notes, if the second lowest note is drawn in with the first, it will be arrested by the backwards moving upper belt 228 due to the interbelt separation being small along lines 246 of closest approach close to the edges of the belt.

The lowest note is drawn forwards into the nip of the rollers 204,205 which take over from the belt 222 the controlled feeding of the note. As it is drawn between the transducer face 217 and the wiper 218 at each measuring station, its thickness is measured. The note is slightly curved to ensure that it is pulled tight onto the faces 217. The measurements made are utilized by processiong apparatus—not shown—to verify the note as a single note and to count it.

The next note is then drawn through by the belt 222. Since it takes a small length of time to accelerate and because the belt 222 is travelling slower than the peripheral speed of the nip rollers 204,205, a gap develops between it and its predecessor. If the gap is insufficiently large, the ratio of the toothed belt wheels 231,232 may be appropriately adjusted to slow the belt 222 with respect to the nip rollers peripheral speed.

Figure 15:
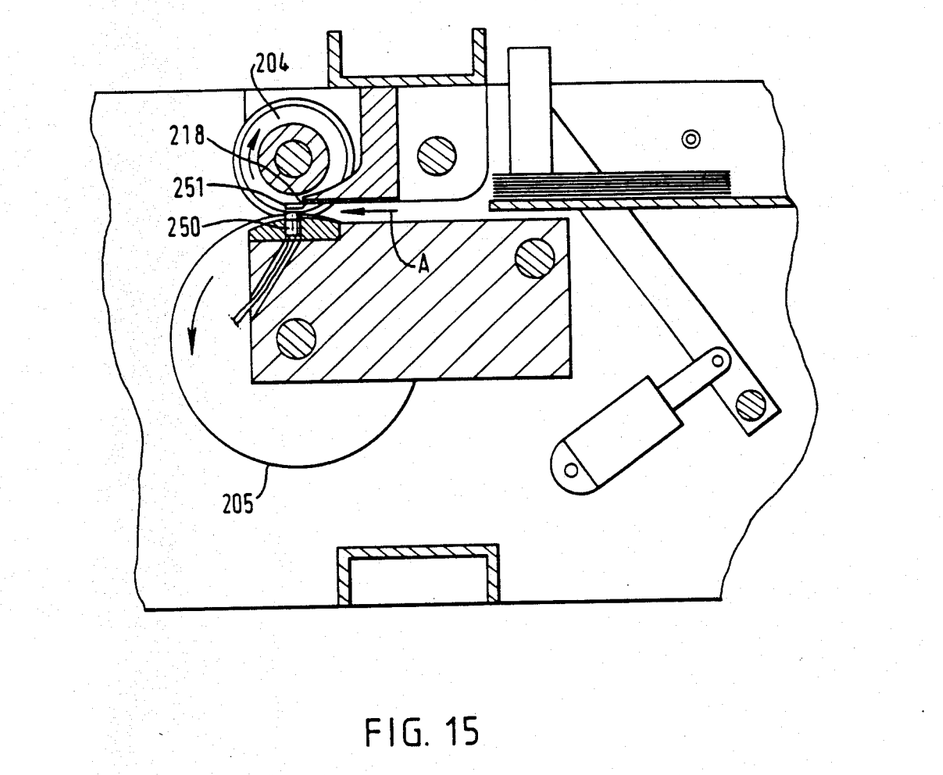
FIG. 15 is a view similar to FIG. 14, showing a variant of the equipment of FIG. 12.

Turning now to FIG. 15, the transducer 216 has there been replaced by a diamond material faced Hall Effect device 250 and a permanent magnet 251 is carried on the wiper 218. Increased separation of the magnet 251 from the Hall Effect device 250 provides a change in magnetic field strength at the device and hence a change in resistance of the device. This can be measured to measure the separation.

It will be appreciated that all the measuring equipments described above provide measurement by means of measuring directly from one to the other the separation of the two sensory elements between which the note passes without reliance upon an intermediate frame, and with at the most the interposition between the note and one sensory element only of only a note abutting member of a sensory element carrier.

I claim:

1. A sheet material thickness measuring apparatus having a measuring station defining a path for sheet material, said measuring station comprising:

two pairs of material transport members, said transport members having sheet material guiding peripheral parts movable in the direction of material travel, said pairs of transport members being spaced apart in a direction transverse to the said path, and each pair being opposite each other on either side of said path; and transducer means positioned between said pairs of material transport members and comprising:

a fixed sensory element at said measuring station on one side of said path; and a second sensory element at said measuring station on the other side of said path and opposite said first sensory element and being adapted to be moved away from said fixed sensory element upon the passage of sheet material along said path, the amount of such movement being dependent on the thickness of said sheet material;

said transducer means being adapted to propagate an energy field between said sensory elements and give an output corresponding to the change in said energy field caused by the relative movement of said sensory elements upon passage of said sheet material, both said sensory elements bearing directly on said sheet material during its presence between said sensory elements.

2. The apparatus of claim 1 wherein said energy field is an electric field.

3. The apparatus of claim 1 wherein said energy field is a magnetic field.

4. The apparatus of claim 1 wherein said energy field is a sound field.

5. The apparatus of claim 1 wherein said material transport members on both sides of said path at said measuring station are positively supported to prevent movement of said peripheral parts laterally away from said path whilst permitting their movement in said direction of travel.

6. The apparatus of claim 1 wherein said material transport members on both sides of the material path in both said pairs of members are positively driven for transport of the material along said path.

7. The apparatus of claim 1 wherein said fixed sensory element extends beyond said peripheral guiding parts of said material transport members on its side of the material path and together with said transport members on the opposite side of the material path imposes a curve on the sheet material transversely of said path.

8. The apparatus of claim 1 wherein said material transport members are rollers.

9. The apparatus of claim 8 wherein one of each of said pairs of material transport rollers has an elastomeric tire gripping the sheet material when the apparatus is operating.

10. The apparatus of claim 9 wherein said material transport rollers having said elastomeric tire are on the second movable sensory element side of said path.

11. The apparatus of claim 8 wherein said fixed sensory element has a head having a radius of curvature less than the radius of said material transport rollers on that side of said path.

12. The apparatus of claim 11 wherein said fixed sensory element is fixed in a transducer carrier and said transport rollers on the side of the material path of said fixed sensory element are rotatably mounted on said transducer carrier.

13. The apparatus of claim 8 wherein said sensory elements bear on said sheet material substantially in a plane which includes the axis of rotation of said rollers on both sides of said path.

14. The apparatus of claim 1 wherein said path through said equipment is substantially flat in the direction of material transport.

15. The apparatus of claim 1 wherein a plurality of said transducer means is provided in a corresponding plurality of like measuring stations across the width of said path.

16. The apparatus of claim 8 wherein said second sensory element is spring-biassed towards the mating fixed transducer sensory element and wherein said second sensory element has a head having a radius of curvature smaller than that of said transport rollers on its side of said path.

17. The apparatus of claim 16 including a leaf spring effecting the spring-biassing.

18. The apparatus of claim 16 including a damper damping movement of the spring-biassed sensory element.

19. The apparatus of claim 1 wherein said fixed transducer sensory element has a hard ceramic sheet material contacting end.

20. The apparatus of claim 1 wherein the transport members of said pairs of transport members on one side of said path are mounted on a removable frame member which also supports one of said sensory elements.

21. The apparatus of claim 20, including a shaft journalled on said removable frame member and carrying both said removable transport members and a dummy transport member for transferring drive to said transport members on the other side of said path via a further dummy transport member.

22. The apparatus of claim 1 including a plurality of measuring stations and a sheet material separator, said measuring stations being distributed equally to both sides of said separator with respect to the transverse direction of the material path and said sheet material separator having two belts, one being arranged to be driven quickly forwards and the other being arranged to be driven slowly backwards, each said belt encircling a drive shaft for said respective transport member on its side of said path.

23. The apparatus of claim 22 wherein said forwards driven one of said separator belts is drivingly connected to said transport member drive shaft on its side of the said path and said backwards driven one of said separator belts is supported on an idler roller journalled on the transport member drive shaft on its side of said path.

24. The apparatus of claim 22 including an adjustable backing member on one of said belts adapted to adjust the separation of said belts.

* * * * *